United States Patent
Lim

(10) Patent No.: US 7,433,010 B2
(45) Date of Patent: Oct. 7, 2008

(54) LIQUID CRYSTAL DISPLAY DEVICE HAVING SEAL PATTERN PREVENTING ELECTROLYTIC CORROSION AND METHOD OF FABRICATING THE SAME

(75) Inventor: Joo Soo Lim, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 127 days.

(21) Appl. No.: 10/294,777

(22) Filed: Nov. 15, 2002

(65) Prior Publication Data

US 2003/0112387 A1  Jun. 19, 2003

(30) Foreign Application Priority Data

Dec. 29, 2001 (KR) ................. 2001-88558

(51) Int. Cl.
*G02F 1/1339* (2006.01)
*G02F 1/1333* (2006.01)
(52) U.S. Cl. .............. 349/153; 349/110; 349/190
(58) Field of Classification Search ............. 349/110, 349/153–154, 42–43, 149, 190
See application file for complete search history.

(56) References Cited

U.S. PATENT DOCUMENTS

| | | | | |
|---|---|---|---|---|
| 4,963,012 A | * | 10/1990 | Tracy et al. | 359/514 |
| 5,712,506 A | * | 1/1998 | Shimoto et al. | 257/633 |
| 5,739,880 A | * | 4/1998 | Suzuki et al. | 349/110 |
| 5,966,194 A | * | 10/1999 | Hu et al. | 349/153 |
| 6,057,900 A | * | 5/2000 | Ono et al. | 349/110 |
| 6,175,397 B1 | * | 1/2001 | Inoue et al. | 349/86 |
| 6,259,505 B1 | * | 7/2001 | Makino | 349/153 |
| 6,429,917 B1 | * | 8/2002 | Okamoto et al. | 349/110 |
| 6,552,764 B2 | * | 4/2003 | Fujioka et al. | 349/106 |
| 6,665,039 B1 | * | 12/2003 | Glownia et al. | 349/153 |
| 7,019,800 B2 | * | 3/2006 | Kuo | 349/110 |

FOREIGN PATENT DOCUMENTS

| | | | |
|---|---|---|---|
| JP | 2000-047227 | * | 2/2000 |
| JP | 2000-111934 | * | 4/2000 |
| JP | 2001-142082 | | 5/2001 |

* cited by examiner

*Primary Examiner*—Dung T. Nguyen
(74) *Attorney, Agent, or Firm*—McKenna Long & Aldridge LLP

(57) ABSTRACT

A liquid crystal display device having a seal pattern preventing electrolytic corrosion and a method of fabricating the same are disclosed in the present invention. The liquid crystal display device includes first and second substrates, a plurality of gate lines, a passivation layer on the gate lines, a first transparent conductive layer on the passivation layer, a black matrix at an inner surface of the second substrate, a second transparent conductive layer on the black matrix, and a sealant covering at least portions of the black matrix and the first and second transparent conductive layers.

30 Claims, 5 Drawing Sheets

LIQUID CRYSTAL DISPLAY DEVICE HAVING SEAL PATTERN PREVENTING ELECTROLYTIC CORROSION AND METHOD OF FABRICATING THE SAME

This application claims the benefit of the Korean Application No. P2001-088558 filed on Dec. 29, 2001, which is hereby incorporated by reference.

BACKGROUND OF THE INVENTION

1. Field of the Invention

The present invention relates to a display device, and more particularly, to a liquid crystal display device having a seal pattern preventing electrolytic corrosion and a method of fabricating the same.

2. Discussion of the Related Art

Generally, a Braun tube, also known as a cathode ray tube (CRT), has been most widely used as a display device because it can easily realize colors and has a fast operation speed. Therefore, the Braun tube has been a major display device for a TV monitor and a computer monitor.

However, the Braun tube (CRT) consumes too much power and has a large volume due to its structural limitation of maintaining a space between an electron gun and a screen. In addition, the Braun tube is too heavy to be portable. In order to resolve such problems or disadvantages of the Braun tube (CRT), various display devices have been developed, such as a TFT-LCD panel, which is currently in practical use.

The TFT-LCD panel can be fabricated thin for ultra-thin display devices, such as wall-mountable television sets. Additionally, the TFT-LCD panel has light weight and consumes considerably less power than that of the Braun tube (CRT). Thus, the TFT-LCD panel can be applied to a display screen of a notebook computer, which can be operated by a battery. As a result, the TFT-LCD panel is considered to be the next generation display device.

A fabrication of the TFT-LCD panel for a liquid crystal display device includes a TFT array process for forming switches applying pixel unit signals, a color filter process for forming a color filter array for realizing colors, and a liquid crystal cell process for forming unit liquid crystal cells driven by signals by adding a driving circuit to the completed TFT and color filter substrates.

The liquid crystal cell process will be described as follows. An alignment material is coated on the completed TFT and color filter substrates. A rubbing process is then carried out on the coated alignment material to provide liquid crystal molecules with uniform directions. Then, a cell gap forming process is carried out to maintain a space between the two substrates. Subsequently, an assembly process for bonding the two substrates to each other and a cell cutting process for cutting the bonded substrates by a cell unit are carried out. Thereafter, liquid crystals are injected in the unit cell, and polarizing plates are attached to both sides of the unit cell to complete the liquid crystal cell process.

The cell cutting process will now be described in detail.

The cell cutting process is to cut and separate the substrates to cell units after the bonding process. In a conventional TN mode, the cutting process by cell unit is carried out after liquid crystals are injected in a plurality of the cells. However, as a cell increases in size, liquid crystals are injected after the unit cell cutting process.

The cell cutting process includes a scribing process for forming a cutting line on a glass substrate using a diamond pen having a hardness greater than that of glass, and a breaking process for cutting the glass by applying external pressure.

A liquid crystal display device according to the related art is explained with reference to the accompanying drawings as follows.

FIG. 1 illustrates a schematic view of a TFT substrate for a liquid crystal display device according to a related art.

Referring to FIG. 1, gate and data lines 21 and 22 are formed on a first substrate 20 to vertically cross one another. Gate and data pads 24 and 25 are formed at the ends of the gate and data lines 21 and 22, respectively.

A thin film transistor 26 acting as a switching device is formed at each pixel area defined by the crossing point of the gate and data lines 21 and 22. A plurality of the pixel areas form active areas representing an image.

A seal pattern 30 is formed on the first substrate 20. The seal pattern 30 is formed on a liquid crystal margin area of a liquid crystal display panel.

In this case, the seal pattern 30 has a liquid crystal injection inlet for injecting liquid crystals in a later process.

Although it is not shown in the drawing, a black matrix, a color filter, a common electrode, and an alignment layer are formed on a second substrate, which is to be bonded and facing into the first substrate 20. The seal pattern 30 may be formed on the same area of the second substrate.

FIG. 2 illustrates a cross-sectional view of portion 'X' shown in FIG. 1.

Referring to FIG. 2, a gate pad pattern 24a formed of the same material as a gate line is formed on a first substrate 20. A passivation layer 35 is formed on the gate pad pattern 24a.

Subsequently, the passivation layer 35 having a contact hole exposing a portion of the gate pad pattern 24a is formed on the entire surface of the first substrate 20. A pixel electrode 40 formed of indium tin oxide (ITO) is formed in the contact hole and on the passivation layer 35 adjacent to the contact hole. A seal pattern 30 is formed on the pixel electrode 40.

In this case, the contact hole is formed to improve adhesion between the seal pattern 30 and an organic layer, which is used as the passivation layer.

A black matrix 55 for shielding light is formed on the inner surface of a second substrate 60 facing into the first substrate 20. A common electrode 52 for simultaneously driving liquid crystals and the pixel electrode 40 is formed on the entire surface of the second substrate 60 including the black matrix 55.

FIG. 3 illustrates a cross-sectional view of portion 'X' shown in FIG. 1 to which a chip on glass (COG) method is applied according to the related art. Herein, the same elements of FIG. 2 are represented by the same numerals for simplicity.

Referring to FIG. 3, a gate pad pattern 24a formed of the same material as a gate line is formed on a first substrate 20. A passivation layer 35 is formed on the entire surface of the first substrate 20 including the gate pad pattern 24a.

A black matrix 55 for shielding light is formed on the inner surface of a second substrate 60 facing into the first substrate 20. A common electrode 52 for simultaneously driving liquid crystals and the pixel electrode 40 is formed on the entire surface of the second substrate 60 including the black matrix 55. A seal pattern 30 is coated on one of the common electrode 52 and the pixel electrode 40.

However, the liquid crystal display device according to the related art has the following problem or disadvantage.

First of all, when the liquid crystal display device is driven for about 24 hours for a reliability test in high temperature and high humidity, after completion of the liquid crystal cell process, water or moisture may penetrate into the cell gap between the first and second substrates 20 and 60. This is because the pixel electrode 40, the common electrode 52, and the black matrix 55 formed of electrically conductive materials are formed outside the sealant 30. Therefore, the electrically conductive black matrix 55 and the gate pad pattern 24a may be deteriorated by electrolytic corrosion.

SUMMARY OF THE INVENTION

Accordingly, the present invention is directed to a liquid crystal display device having a seal pattern preventing electrolytic corrosion and a method of fabricating the same that substantially obviates one or more of problems due to limitations and disadvantages of the related art.

Another object of the present invention is to provide a liquid crystal display device having a seal pattern preventing electrolytic corrosion and a method of fabricating the same that can be stably driven by forming a sealant pattern on a periphery of the entire patterns made of electrically conductive materials, thereby preventing electrolytic corrosion of the electrically conductive materials during a reliability test in high temperature and high humidity.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates, a plurality of gate lines on the first substrate, a passivation layer on the gate lines, a first transparent conductive layer on the passivation layer, a black matrix at an inner surface of the second substrate, a second transparent conductive layer on the black matrix, and a sealant covering at least portions of the black matrix and the first and second transparent conductive layers.

In another aspect of the present invention, a method of forming a liquid crystal display device includes forming first and second substrates, forming a plurality of gate lines on the first substrate, forming a passivation layer on the gate lines, forming a first transparent conductive layer on the passivation layer, forming a black matrix at an inner surface of the second substrate, forming a second transparent conductive layer on the black matrix, and forming a sealant covering at least portions of the black matrix and the first and second transparent layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
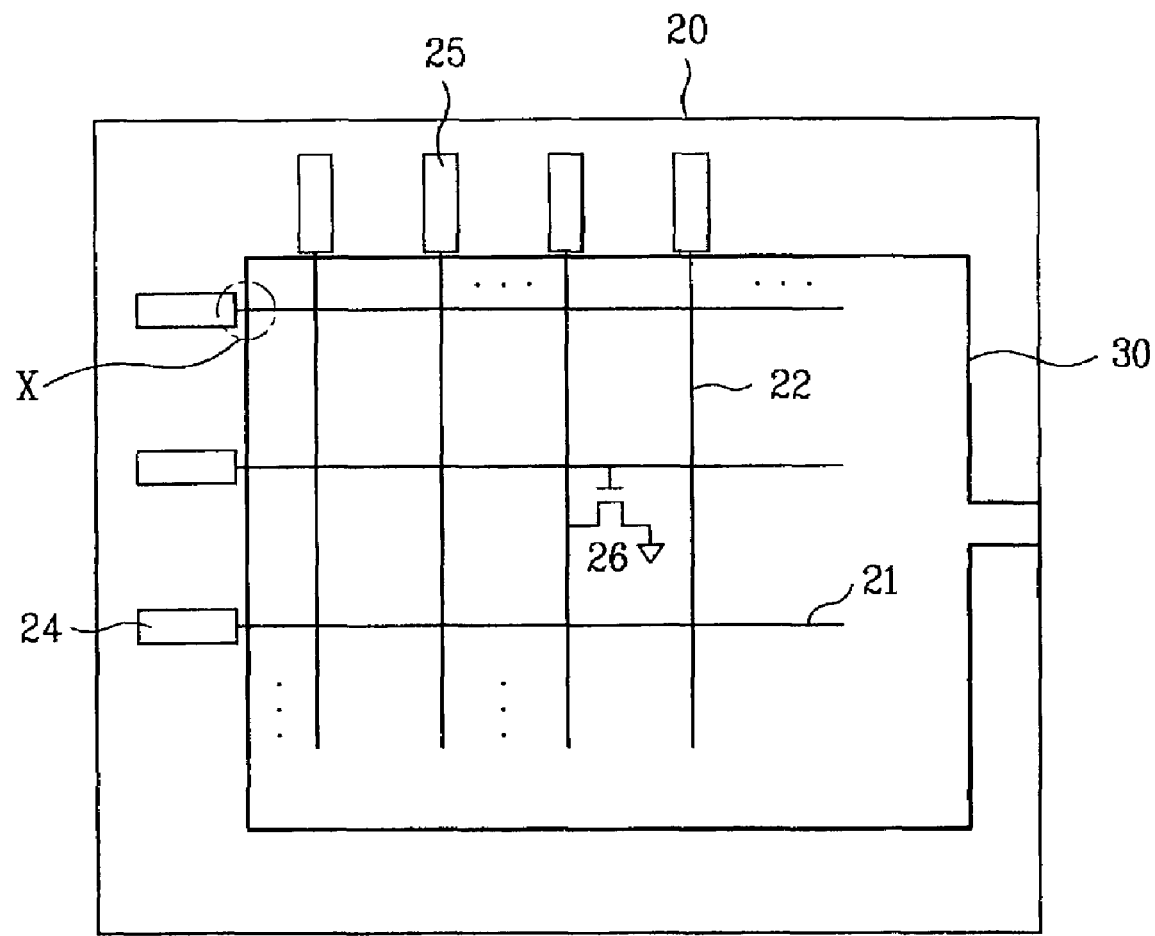
FIG. 1 illustrates a schematic layout of a TFT substrate in a liquid crystal display device according to a related art.
Figure 2:
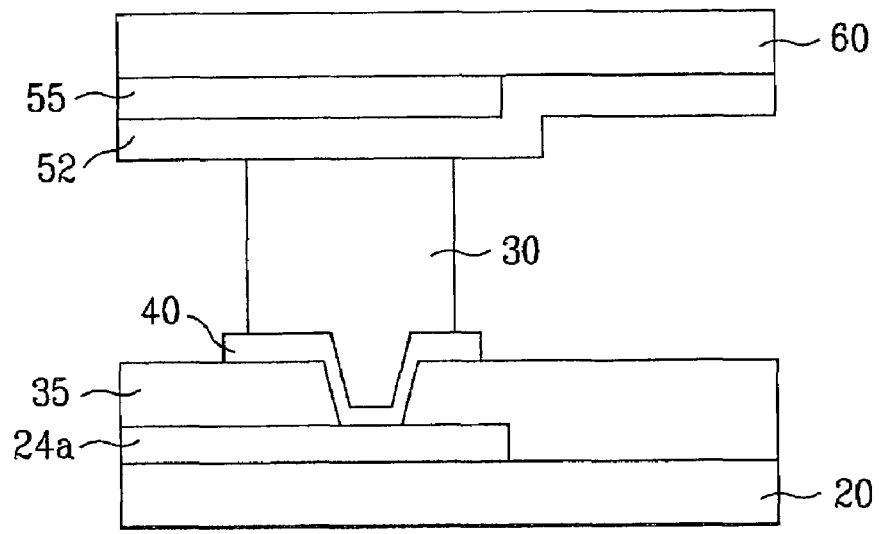
FIG. 2 illustrates a cross-sectional view of portion 'X' shown in FIG. 1.
Figure 3:
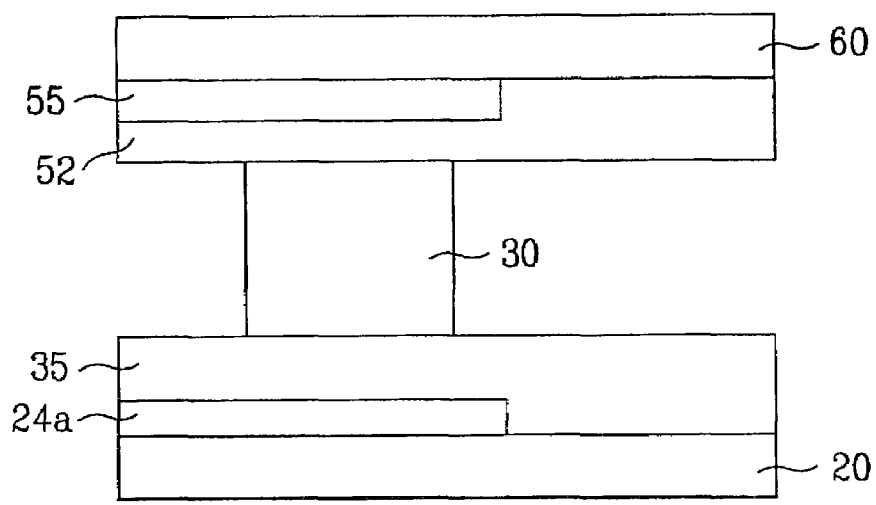
FIG. 3 illustrates a cross-sectional view of portion 'X' shown in FIG. 1 to which a chip on glass (COG) method is applied according to the related art.
Figure 4:
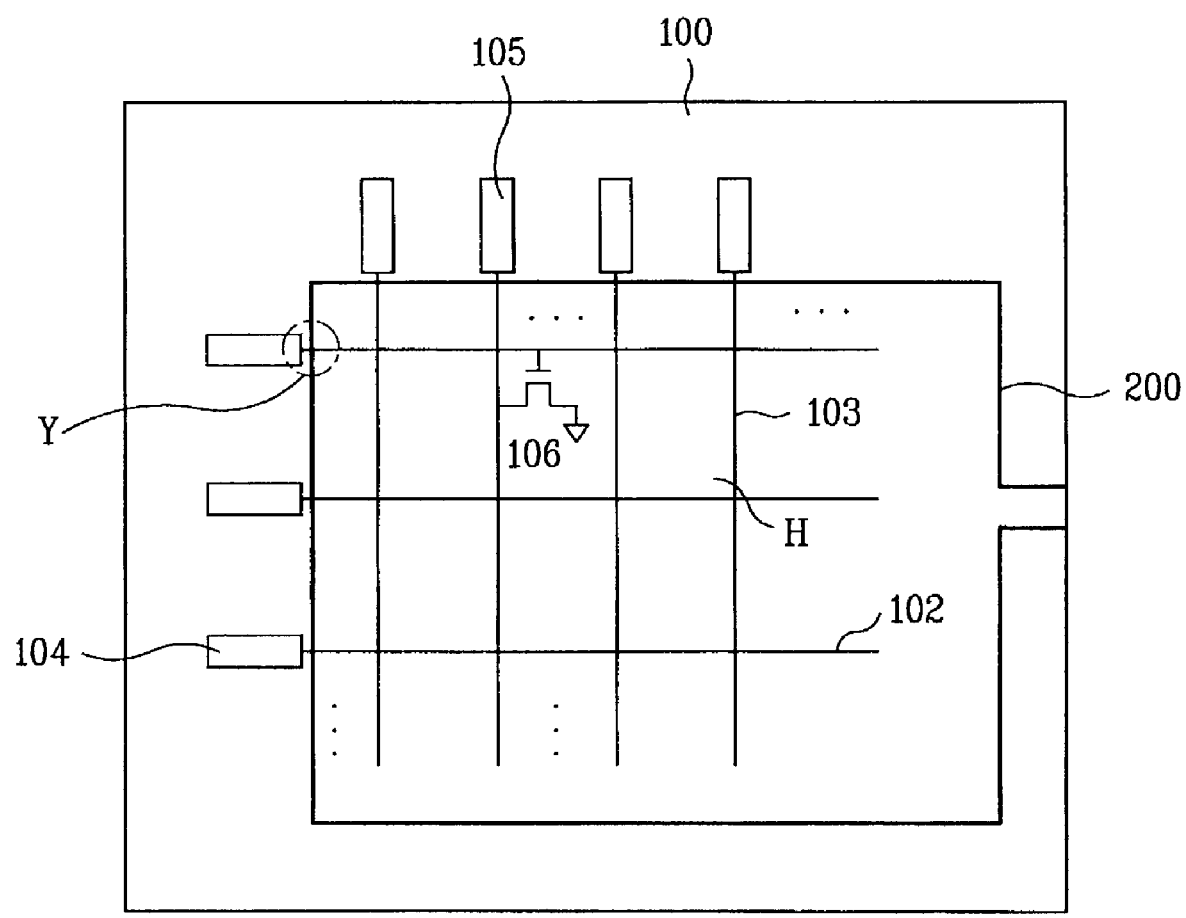
FIG. 4 illustrates a layout of a liquid crystal display device according to the present invention.

FIG. 4 illustrates a layout of a liquid crystal display device according to the present invention.

As shown in FIG. 4, a liquid crystal panel includes a first substrate 100 attached to a second substrate (not shown). A plurality of gate and data lines 102 and 103 cross one another on the first substrate 100 to define unit pixel areas H, respectively. A thin film transistor 106 for driving liquid crystals is formed at each intersection of the gate and data lines 102 and 103.

Gate and data pads 104 and 105 are formed at the ends of a plurality of the gate and data lines 102 and 103, respectively.

A seal pattern 200 is formed at a seal area, which is located at the periphery of the liquid crystal display panel, by depositing a sealant using a silk screen printing method through a seal mask. The seal pattern 200 may also be formed by using a dispensing method.

The first substrate 100 is divided into an active area and a seal area. The seal pattern 200 may be formed on either the first substrate 100 or the second substrate (not shown).

In this case, the seal pattern 200 according to the present invention is formed to surround the outer portions of the gate and data pads 104 and 105.

Figure 5:
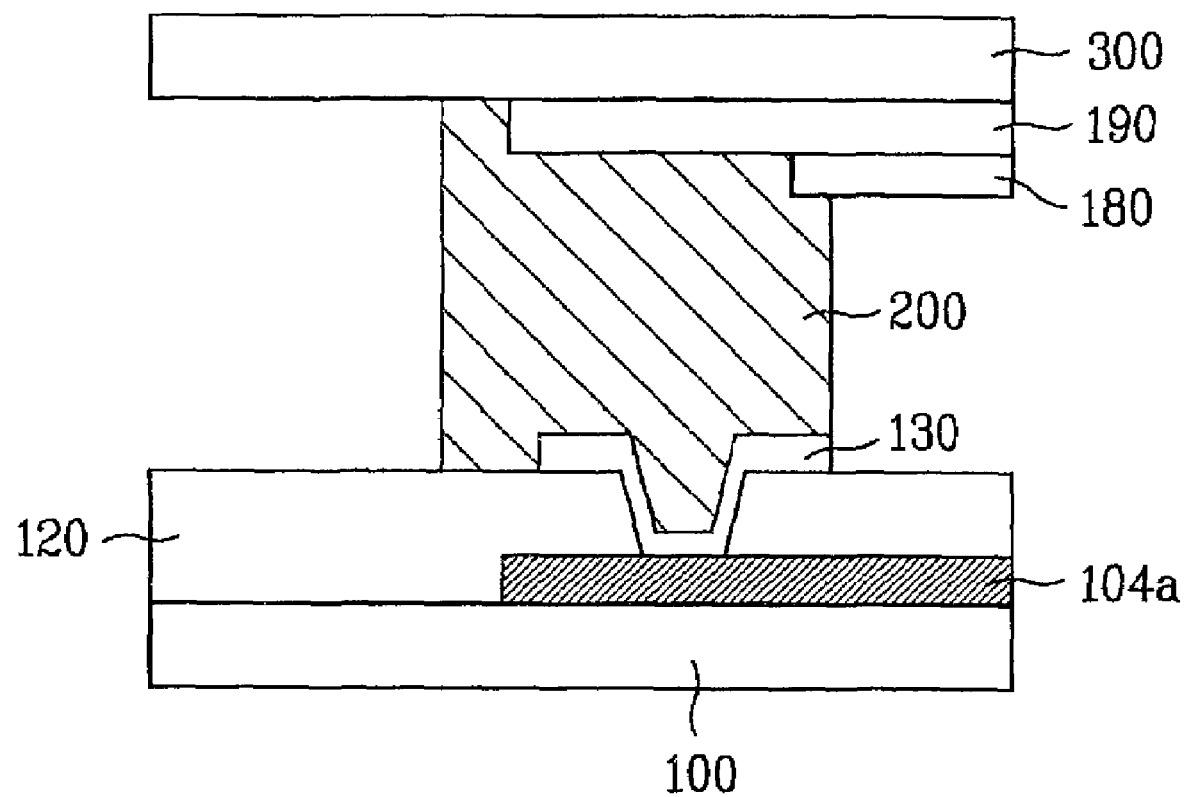
FIG. 5 illustrates a cross-sectional view of portion 'Y' shown in FIG. 4.

FIG. 5 illustrates a cross-sectional view of portion 'Y' shown in FIG. 4.

Referring to FIG. 5, first and second substrates 100 and 300 face into each other. A gate pad pattern 104a is formed on the first substrate 100. A passivation layer 120 is formed on the entire surface of the first substrate 100 and has a contact hole exposing a portion of the surface of the gate pad pattern 104a. A first transparent conductive layer 130 formed of ITO is formed in and outside the contact hole.

Herein, the first transparent conductive layer 130 is a pixel electrode. The passivation layer 120 may be formed of an organic insulating layer, such as BCB or photo-acrylate. A black matrix 190 is formed to prevent light leakage on the inner surface of the second substrate 300 facing into the first substrate 100.

A second transparent conductive layer 180, simultaneously driving the liquid crystals along with the first transparent conductive layer 130, is formed on the second substrate 300 including the black matrix 190.

In this case, the second transparent conductive layer 180 is a common electrode. The black matrix 190 is formed at least about 2.0 mm inside the edge of the second substrate 300.

A seal pattern 200 is formed to surround the peripheries of the black matrix 190, the first transparent conductive layer 130, and the gate pad pattern 104a.

More specifically, the first transparent conductive layer 130, the gate pad pattern 104a formed of electrically conductive materials are formed to be located inside the seal pattern 200, thereby preventing electrolytic corrosion during a reliability test in high temperature and high humidity. This may also be applicable to a chip on glass (COG) package, a tape-automated bonding (TAB) package, and the like.

Figure 6:
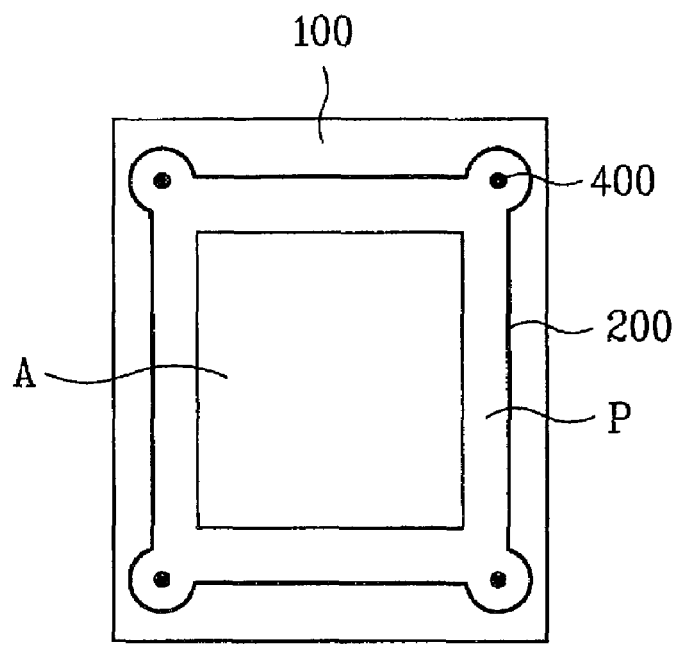
FIGS. 6 and 7 illustrate layouts of the seal patterns in the liquid crystal display device according to the present invention.
Figure 7:
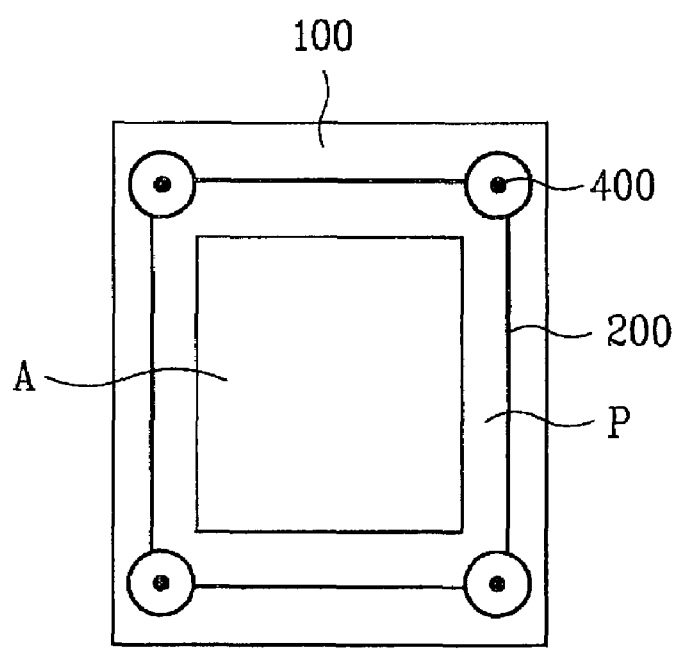

FIGS. 6 and 7 illustrate layouts of the seal patterns in the liquid crystal display device according to the present invention.

As shown in FIGS. 6 and 7, an active area A and a pad area P are formed on a first substrate 100. The active area A includes a plurality of pixel areas defined by a plurality of gate and data lines vertically crossing one another to represent an image. A pad area P includes the end areas of the gate and data lines around the periphery of the active area A.

A seal pattern 200 is formed at the periphery of the pad area P. The seal pattern 200 may be formed in a dot type conductive layer 400 for applying a voltage to a transparent conductive layer (not shown) formed on a second substrate (not shown) facing into the first substrate 100, so as to drive the liquid crystal layer. Herein, the dot type conductive layer 400 may be formed of silver (Ag) having excellent electric conductivity.

Meanwhile, the seal pattern 200 is formed to surround the dot type conductive layer 400. The corners of the seal pattern 200 are round so as to surround the dot type conductive layer 400.

More specifically, as shown in FIG. 6, the seal pattern 200 may be formed in a dumbbell or rectangular shape to have the dot type conductive layers 400 formed therein. However, the seal pattern 200 may also be formed in any other shapes including a polygonal shape as long as it surrounds the dot type conductive layers 400. On the other hand, as shown in FIG. 7, the area of the seal pattern 200, in which the dot type conductive layers 400 are formed, is formed in a doughnut shape, so as to allow the seal pattern 200 to surround the dot type conductive layers 400.

Accordingly, the liquid crystal display device according to the present invention has the following advantages or effects.

The gate pad, the transparent conductive layer, and the black matrix formed of electrically conductive materials are formed to be located inside the seal pattern, thereby preventing electrolytic corrosion of the black matrix or conductive materials during a reliability test in high temperature and high humidity.

Also, the seal pattern is formed to surround the dot type conductive layer, thereby preventing electrolytic corrosion of the conductive materials, which is caused by the penetration of water.

Furthermore, the present invention improves a stability in driving the liquid crystal display device and its image quality.

It will be apparent to those skilled in the art that various modifications and variations can be made in the liquid crystal display device having a seal pattern preventing electrolytic corrosion and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
   first and second substrates;
   a plurality of gate lines on the first substrate;
   a passivation layer on the gate lines;
   a first transparent conductive layer on the passivation layer;
   a black matrix at an inner surface of the second substrate;
   a second transparent conductive layer on the black matrix; and
   a sealant covering at least portions of the black matrix and the first and second transparent conductive layers,
   wherein a bottom surface of the sealant directly contacts with at least passivation layer and the outer peripheral portion of the first transparent conductive layer,
   wherein a top surface of the sealant directly contacts with at least the second substrate and the outer peripheral portions of the black matrix and the second transparent conductive layer.

2. The device of claim 1, wherein the sealant covers the gate lines.

3. The device of claim 1, wherein the passivation layer is formed of an organic insulating layer.

4. The device of claim 3, wherein the organic insulating layer includes one of BCB and photo-acrylate.

5. The device of claim 1, further comprising a conductive layer on the second substrate.

6. The device of claim 5, wherein the sealant is formed to surround the conductive layer.

7. The device of claim 5, wherein the conductive layer includes silver (Ag).

8. The device of claim 1, wherein the first transparent conductive layer is a pixel electrode.

9. The device of claim 1, wherein the second transparent conductive layer is a common electrode.

10. The device of claim 1, wherein the first and second transparent conductive layers are formed of indium tin oxide (ITO).

11. The device of claim 1, wherein the black matrix is formed at least about 2.0 mm inside an edge of the second substrate.

12. The device of claim 1, wherein the first transparent conductive layer is contacted with a portion of the gate lines.

13. The device of claim 1, wherein the sealant is formed on one of the first and second substrates.

14. The device of claim 1, wherein the sealant has rounded corners.

15. The device of claim 1, wherein the sealant includes one of dumbbell, rectangle, doughnut, and polygonal shapes.

16. A method of forming a liquid crystal display device, comprising:
   forming first and second substrates;
   forming a plurality of gate lines on the first substrate;
   forming a passivation layer on the gate lines;
   forming a first transparent conductive layer on the passivation layer;
   forming a black matrix at an inner surface of the second substrate;
   forming a second transparent conductive layer on the black matrix; and
   forming a sealant covering at least portions of the black matrix and the first and second transparent layers,
   wherein a bottom surface of the sealant directly contacts with at least passivation layer and the outer peripheral portion of the first transparent conductive layer,
   wherein a top surface of the sealant directly contacts with at least the second substrate and the outer peripheral portions of the black matrix and the second transparent conductive layer.

17. The method of claim 16, wherein the sealant covers the gate lines.

18. The method of claim 16, wherein the passivation layer is formed of an organic insulating layer.

19. The method of claim 18, wherein the organic insulating layer includes one of BCB and photo-acrylate.

20. The method of claim 16, further comprising forming a conductive layer on the second substrate.

21. The method of claim 20, wherein the sealant is formed to surround the conductive layer.

22. The method of claim 20, wherein the conductive layer includes silver (Ag).

23. The method of claim 16, wherein the first transparent conductive layer is a pixel electrode.

24. The method of claim 16, wherein the second transparent conductive layer is a common electrode.

25. The method of claim 16, wherein the first and second transparent conductive layers are formed of indium tin oxide (ITO).

26. The method of claim 16, wherein the black matrix is formed at least about 2.0 mm inside an edge of the second substrate.

27. The method of claim 16, wherein the first transparent conductive layer is contacted with a portion of the gate lines.

28. The method of claim 16, wherein the sealant is formed on one of the first and second substrates.

29. The method of claim 16, wherein the sealant has rounded corners.

30. The method of claim 16, wherein the sealant includes one of dumbbell, rectangle, doughnut, and polygonal shapes.

* * * * *